United States Patent
Gschwendtner et al.

(10) Patent No.: US 10,800,109 B2
(45) Date of Patent: Oct. 13, 2020

(54) TOOL FOR HF WELDING, INSTALLATION FOR PRODUCING A BAG FOR MEDICAL PURPOSES AND METHOD FOR OPERATING SUCH AN INSTALLATION

(71) Applicant: KIEFEL GmbH, Freilassing (DE)

(72) Inventors: Rupert Gschwendtner, Bad Reichenhall (DE); Martin Klein, Hallein (AT); Rudolf Berger, Freilassing (DE); Marco Hobelsberger, Saaldorf-Surheim (DE)

(73) Assignee: KIEFEL GmbH, Freilassing (DE)

( * ) Notice: Subject to any disclaimer, the term of this patent is extended or adjusted under 35 U.S.C. 154(b) by 80 days.

(21) Appl. No.: 16/077,364

(22) PCT Filed: Dec. 28, 2016

(86) PCT No.: PCT/DE2016/000440
§ 371 (c)(1),
(2) Date: Aug. 10, 2018

(87) PCT Pub. No.: WO2017/137019
PCT Pub. Date: Aug. 17, 2017

(65) Prior Publication Data
US 2019/0047233 A1   Feb. 14, 2019

(30) Foreign Application Priority Data

Feb. 10, 2016 (DE) .................. 10 2016 001 428
Sep. 8, 2016 (DE) .................. 10 2016 010 766

(51) Int. Cl.
*B29C 65/00*   (2006.01)
*A61J 1/10*   (2006.01)
(Continued)

(52) U.S. Cl.
CPC .......... *B29C 66/53262* (2013.01); *A61J 1/10* (2013.01); *B29C 65/04* (2013.01); *B29C 66/1122* (2013.01); *B29C 66/232* (2013.01); *B29C 66/3452* (2013.01); *B29C 66/63* (2013.01); *B29C 66/81263* (2013.01);
(Continued)

(58) Field of Classification Search
CPC ........ B29C 66/53262; B29C 66/53263; B29C 66/81871; B31B 70/84; B31B 70/844; B65D 75/5866; B65D 75/5883; B65D 2575/58; B65D 2575/583; B65B 61/186; B29L 2031/7148
See application file for complete search history.

(56) References Cited

FOREIGN PATENT DOCUMENTS

| JP | H08 117318 A | 5/1996 |
|----|----|----|
| JP | H11 235376 A | 8/1999 |

(Continued)

OTHER PUBLICATIONS

WIPO, U.S. International Search Authority, International Search Report and Written Opinion dated Apr. 25, 2017 in International Patent Application No. PCT/DE2016/000440, 11 pages.

*Primary Examiner* — Carson Gross
(74) *Attorney, Agent, or Firm* — Inskeep IP Group, Inc.

(57) ABSTRACT

A system and method for producing a medical bag with an HF welder that uses upper and lower dies each having a plurality of electrode lamellae arranged such that they are alternatingly polarized relative to adjacent lamellae and opposing lamellae. Interspersed dielectric materials may be used to impart contours onto the film material to produce a patterned bag.

19 Claims, 4 Drawing Sheets

Figure 1:
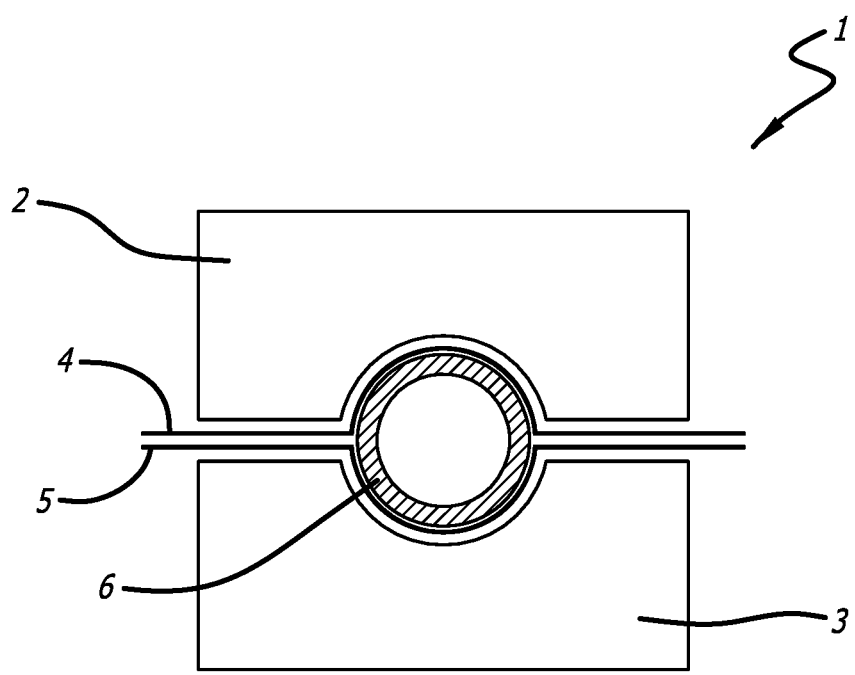

(51) Int. Cl.
    *B29C 65/04*           (2006.01)
    *B29L 31/00*           (2006.01)
    *B65D 75/58*           (2006.01)
    *B65B 61/18*           (2006.01)
    *B31B 70/84*           (2017.01)

(52) U.S. Cl.
    CPC .. *B29C 66/81431* (2013.01); *B29C 66/81461* (2013.01); *B29C 66/8322* (2013.01); *B29C 66/81423* (2013.01); *B29C 66/81871* (2013.01); *B29C 66/83221* (2013.01); *B29L 2031/7148* (2013.01); *B31B 70/844* (2017.08); *B65B 61/186* (2013.01); *B65D 75/5866* (2013.01); *B65D 75/5883* (2013.01)

(56) References Cited

FOREIGN PATENT DOCUMENTS

JP       2000 237280 A    9/2000
WO    WO 2007/140760 A2   12/2007

TOOL FOR HF WELDING, INSTALLATION FOR PRODUCING A BAG FOR MEDICAL PURPOSES AND METHOD FOR OPERATING SUCH AN INSTALLATION

RELATED APPLICATIONS

This application is the U.S. National Phase of and claims priority to International Patent Application No. PCT/DE2016/000440, International Filing Date Dec. 28, 2016, entitled Tool For HF Welding, Installation For Producing A Bag For Medical Purposes And Method For Operating Such An Installation; which claims benefit of German Patent Application Serial No. 10 2016 001 428.8 filed Feb. 10, 2016; and German Patent Application Serial No. 10 2016 010 766.9 filed Sep. 8, 2016; all of which are incorporated herein by reference in their entireties.

The invention relates to a tool for HF (high-frequency) welding, a system for producing a bag for medicinal purposes and a method for operating such a system.

The invention specifically relates to a device and a method for operating an HF plastic welding machine, the device welding, by way of an upper die and a lower die, an inserted part with an axial direction to two films to form a bag, each die comprising a plurality of electrode lamellae disposed next to one another, the arrangement of the electrode lamellae in the device and the use of the device in the HF plastic welding machine being characterized such that the electrode lamellae are alternatingly polarized along the axial direction of the inserted part and oppositely polarized perpendicular to the axial direction. Also, the electrodes can be separated from one another along the axial direction of the inserted piece by way of a dielectric material comprising a solid member.

The invention further pertains to a system and a method for producing a bag for medicinal purposes, the system comprising a film feeder, a welding station and preferably a filling station. The system can comprise a plurality of support rods for holding the inserted parts, wherein the support rods are electrically separated from the HF power circuit.

High-frequency welding is a welding technique in which high-frequency electrical energy is introduced to the area to be welded. The resulting mechanical vibrations lead to molecular and boundary friction which causes heating of the partners to be joined. The heating causes the partners to be joined to soften and to bond in the molten state. When the energy introduction ends, the partners to be joined cool, solidify and are welded together. The resulting weld is very stable. In particular, they can be watertight.

In HF welding processes, a differentiation is made between methods which utilize the homogeneous main electric field on the direct connection between the oppositely polarized electrode pairs, those which utilize the non-homogeneous electrical stray field and those which utilize both portions of the overall electrical field between the electrodes combined for purposes of the joining process.

HF welding methods are frequently used to weld films together to form an airtight or watertight bag or tube.

Also, HF welding methods can be used to seal in an inserted part with an axial direction into two films.

In medical products technology, this method allows bags to be produced in which an inserted part with an axial direction is placed. To do so, in general inserted parts are welded to two films and the two films are welded to one another. An inserted part which is often used is a plastic tube, it being possible to produce a bag with a tubular opening.

In general, applications of HF welding methods for sealing an object in two films must be differentiated between a small tube to be sealed between two films and longer objects or full profile objects to be sealed.

If a short tube is to be sealed between two films, often a mandrel is inserted into the tube for the welding. If a long tube is to be sealed and if for technical-practical reasons no mandrel can be inserted thereinto, or if a full profile object such as a cable is to be welded, tools not involving mandrels are used.

Abele, Kunststoff-Fügeverfahren, Carl Hanser Verlag Munich, 1977, illustrates a number of methods of this type. For example, FIG. 243b of this publication illustrates an electrode arrangement in which the electrode at the lower die is designed as a single piece, whereas the electrode at the upper die is made of three pieces. In addition, a central electrode is in place (a mandrel). With this tool, in a single welding process a welded connection between the tube to be welded and two films can be produced as well as between the two films to each other.

Furthermore, it is prior knowledge to carry out a weld between a tube and two films in two work steps in succession: first the mandrel is subjected to a high frequency while the upper die and the one-piece lower die are each switched to grounded. This results in welding at the periphery of the tube. In the second step, welding is produced between the films, often along a bag periphery. To this end, the upper die is subjected to a different polarity than the lower die while the mandrel is switched to neutral. The welding between the two films which results from this takes place either immediately along the entire bag periphery or first in a small area lateral to the sealed tube, and then along the bag periphery using a bag periphery welding tool. In the latter case, the two welding areas overlap one another with respect to the films in order to produce a sealed connection.

In the welding process with a mandrel, the welding takes place both by way of the main fields between the electrodes and by way of stray fields which form at the edges of the electrodes. On the other hand, in welding processes without mandrels the welding processes with the cable or similar objects occur mostly only by way of stray fields.

The latter method, namely cable welding using HF welding methods, is described by Abele in a subsequent book on pages 469, 470.

A tool and a method for sealing tube pieces with a shared mandrel is known from WO 2007/140760 A2. These enable the sealing of an inserted piece and the welding of two films to form a bag, both in a single procedure.

U.S. Pat. No. 4,900,389 A discloses an HF welding method for joining a radially-symmetric tube end to a radially-symmetric tube closure by way of a main axial field. However, U.S. Pat. No. 4,900,389 does not disclose a welding of the tube end to films to form a bag.

WO 2007/140760 A2 by the same applicant discloses a tool for HF welding of an inserted part to two films, the tool comprising an upper die and a lower die, each of which comprises a plurality of electrode lamellae which are alternatingly polarized in a longitudinal direction of the inserted part and which are symmetrically polarized perpendicular to this direction, wherein a free connection exists between edges of adjacent electrode lamellae oriented to the inserted piece."

The problem to be solved by the invention is to provide an alternative or improvement to the prior art.

According to a first aspect of the invention, the problem is solved by a tool for HF welding of an inserted part with an axial direction to two films to form a bag, the tool comprising an upper die and a lower die, each of which comprises a plurality of electrode lamellae disposed next to one another, wherein the electrode lamellae are polarized in alternating fashion along the axial direction and are oppositely polarized perpendicular to the axial direction.

The prior art has until now provided that tools for HF welding of an inserted part to two films, the tools comprising an upper die and a lower die, each of which comprises a plurality of electrode lamellae, are polarized in alternating fashion in the axial direction of the inserted part and are symmetrically polarized perpendicular to said direction (see WO 2007/140760 A2). In deviation of this, it is proposed here that the electrode lamellae be polarized in alternating fashion in the axial direction of the inserted part and oppositely polarized perpendicular to this direction.

The resultant advantage is that this permits an electromagnetic field to form at each electrode lamella pairing paired in the axial direction of the inserted piece, the electromagnetic field being called a "cross field" below. An electrode lamella pairing here is any electrode lamella pair consisting of an upper die and a lower die opposite to one another. A paired electrode lamella pairing describes an adjacent arrangement of electrode lamella pairs in the axial direction of the inserted piece.

The welding by way of the cross fields achieved by the tool arrangement presented here is called cross-field welding by the inventors as a catch phrase in view of the geometric construction of the stray fields.

The cross-field welding facilitates the sealing of almost any inserted piece in only one welding procedure.

Furthermore, when suitable parameters are selected, cross-field welding sometimes leads to a very stable, sealed welding of an inserted part with an axial direction to two films to form a bag.

It is especially preferred for the upper die and the lower die to have an identical number of electrode lamellae. An advantage is that this facilitates a very sealed welding of the films to one another.

According to a second aspect of the invention, the problem is solved by a tool for HF welding of an inserted part with an axial direction to two films to form a bag, the tool comprising an upper die and a lower die, each of which comprises a plurality of electrode lamellae disposed next to one another, wherein the electrode lamellae are separated from one another along the axial direction by way of a dielectric material comprising a solid member.

The use of a dielectric material comprising a solid member for electrically separating the electrode lamellae, which comprise an upper die and a lower die, in the axial direction of the inserted piece enables very small lamellae distances to be maintained between the electrode lamellae, and also reduces the energy requirement of the tool presented here.

A solid member is understood here to mean a material which has a solid aggregate state at room temperature (20° C.). This material or solid can comprise any mix of materials. For example, the material can be designed as a woven fabric, a netting, a web, non-woven fabric, textile, knitted fabric, etc. and can therefore consist of threaded structures. Furthermore, a solid member here is also understood as a porous material which includes other materials in non-solid aggregate states. Thus, a solid member understood here also includes a non-airtight or non-watertight member made of a threaded material which has a solid aggregate state at room temperature.

In an advantageous embodiment of the invention, the dielectric material has a setback edge or a leading edge relative to the electrodes or it can also be flush with the electrodes. There are also conceivable combinations of the variants identified.

The geometrical structure of the dielectric material which separates the electrode lamellae in the axial direction of the inserted piece can allow for an advantageous geometric structure of the melting together of the partners to be joined during HF welding.

This advantageous structure of the melt on the one hand facilitates a very solid and sealed weld and on the other hand a defined geometric design of the bag in the area of the weld, and this defined design can be used for a positive fit with other formed parts.

Alternatively, the dielectric material can end flush with the electrodes.

Also, the variant of the invention proposed here in which the dielectric material ends flush with the electrodes can be very advantageous when using cross-field welding. This variant makes a very concentrated cross field possible which reduces the power requirement for the overall tool and achieves a very homogeneous melt in the partners to be joined.

It is particularly preferred for the dielectric material to have a contouring on the side facing the film. This contouring can be chosen arbitrarily. As soon as the plastic begins to flow in the welding tool, the plastic also travels into the shape predefined by the contouring of the dielectric material and in this way obtains the negative shape of the contouring upon re-solidification. This gives rise to a specific contouring in the area of the weld as desired. This can be used very preferably for a positive fit with other components which can form an assembly in common with the bag for medicinal purposes. In this way, entirely new ways to use the manufactured bag in medical technology are revealed.

It is particularly advantageous that the contouring can be structured to be radially symmetric and that the contouring does not depend on the axial direction of the inserted piece. A variant of this contouring method is the geometry of an n-cornered star with sharp outer edges and rounded inner edges. Test models have shown that in this form of contouring, particularly advantageous welding results can be achieved.

According to a third aspect of the invention, the problem posed is solved by a system for producing a bag for medicinal purposes, the system comprising a film feeder, a welding station and preferably a filling station, wherein the welding station comprises a tool according to one of the above aspects of the invention.

This aspect of the invention enables integration of a tool according to one of the above aspects into a welding station. In this way, the preferred product to be produced using the invention, a bag for medicinal purposes, can be produced first. The welding station combines known aspects of a welding station with one of the tools proposed here.

It is especially preferred for the system for producing a bag for medicinal purposes to comprise a plurality of support rods for holding the inserted part or inserted parts, the support rods being electrically separated from the HF power circuit.

The support rods enable simple and efficient positioning of the inserted parts. Furthermore, the support rods prevent the inserted parts from shifting or accidentally being displaced during any of the process steps needed for the HF welding.

According to a fourth aspect of the invention, the problem posed is solved by a method for operating a system for producing a bag for medicinal purposes.

The method enables the very preferable production of a broad and flexible product palette in the segment of bags for medicinal purposes.

Figure 4:
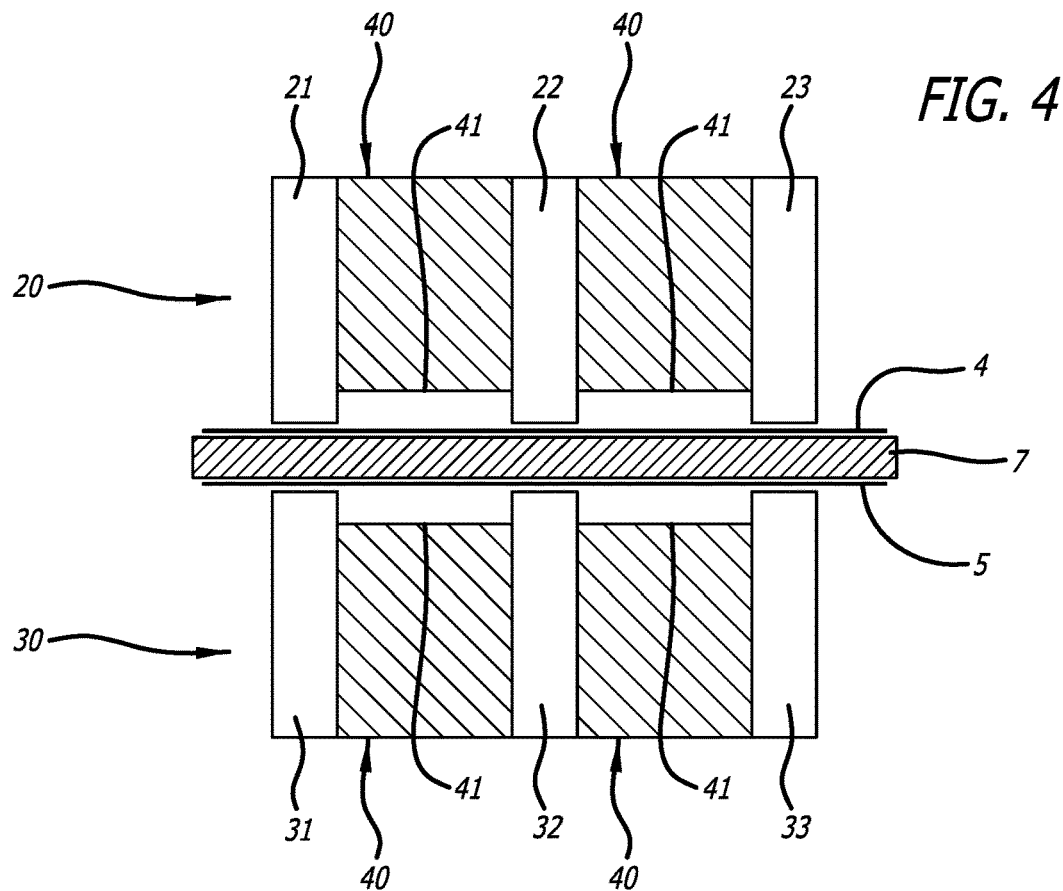
Figure 5:
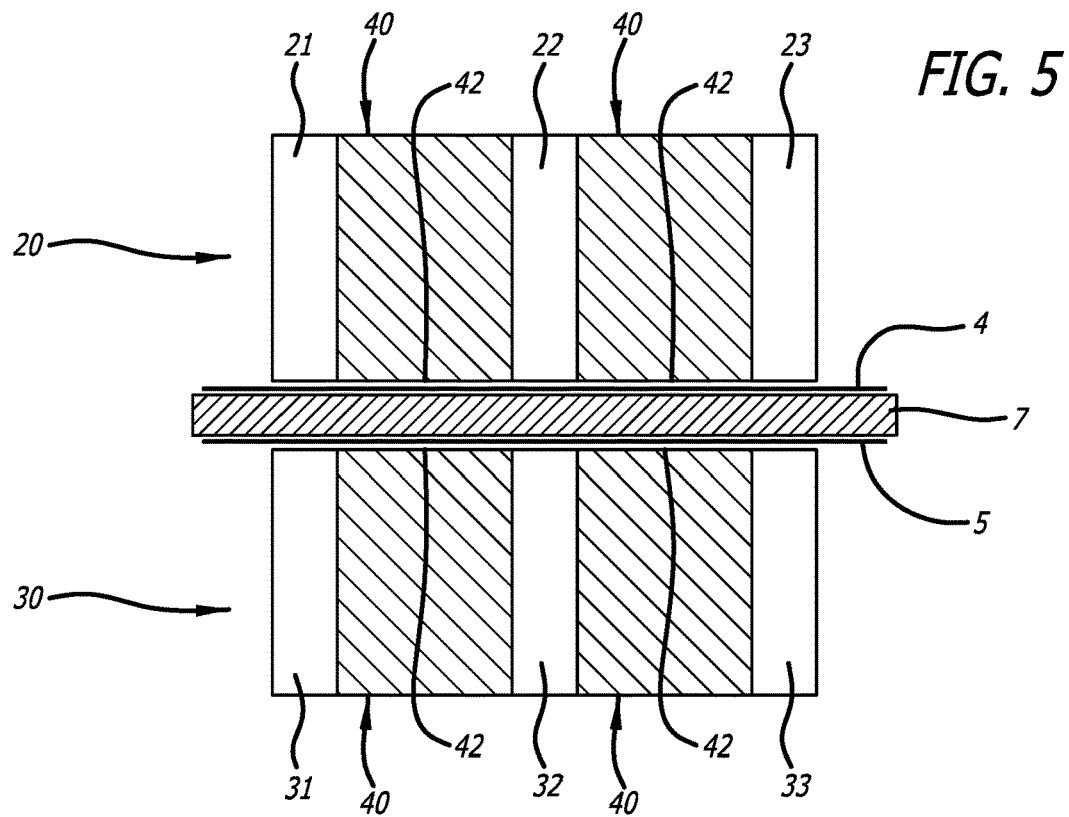

Below, the invention is explained in more detail with the help of an exemplary embodiment and with reference to the drawing. Shown are FIG. 1 a schematic section of a welding tool, wherein the direction normal to the section corresponds to an axial direction of an inserted part, with a tubular inserted part in place but not yet welded and two films not yet welded, wherein the direction of the section runs through a pair of electrode lamellae, FIG. 2 a section through the welding tool, wherein the direction normal to the section corresponds to the axial direction of the inserted part, with a round circular inserted part in place but not yet welded and two films not yet welded, FIG. 3 a schematic of an exploded 3D view of a welding tool for an inserted part with an axial direction, with an inserted part in place but not yet welded and two films not yet welded, wherein the upper die and the lower die each comprise three electrode lamellae disposed next to one another as an example, FIG. 4 a schematic of the layout of the HF welding tool in a longitudinal section according to view IV-IV in FIG. 3, with an exemplary embodiment for a dielectric material between the electrode lamellae, the dielectric material having a setback edge relative to the electrode lamellae, wherein the upper die and the lower die each comprise three electrode lamellae disposed next to one another as an example, FIG. 5 a schematic of the layout of the HF welding tool in a longitudinal section according to view V-V in FIG. 3 with an exemplary embodiment for a dielectric material between the electrode lamellae, the dielectric material ending flush with the electrode lamellae, wherein the upper die and the lower die each comprise three electrode lamellae disposed next to one another as an example, and FIG. 6 a schematic of the layout of the HF field in the tool in a longitudinal section according to view VI-VI in FIG. 3, wherein the upper die and the lower die both comprise three electrode lamellae disposed next to one another as an example.

Figure 2:
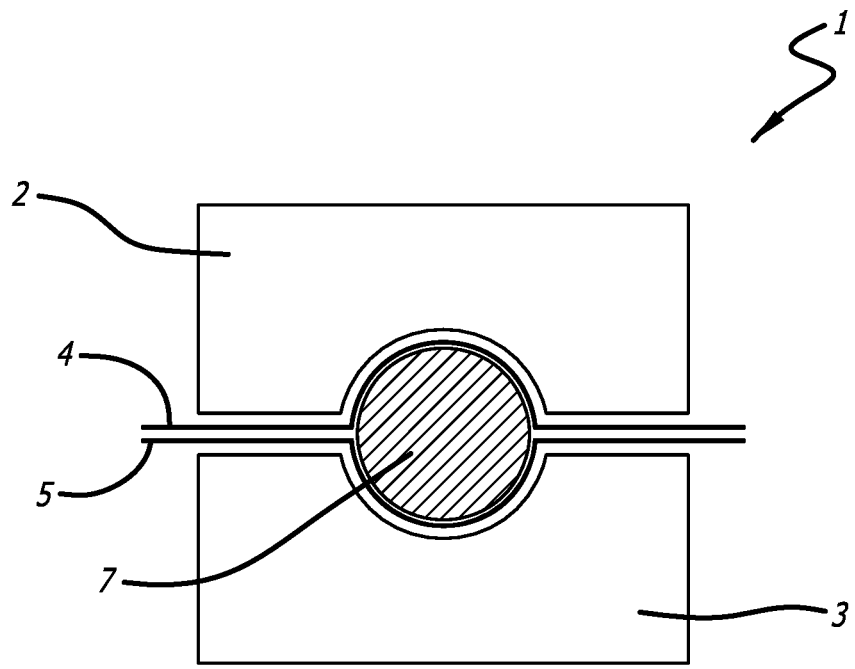
Figure 3:
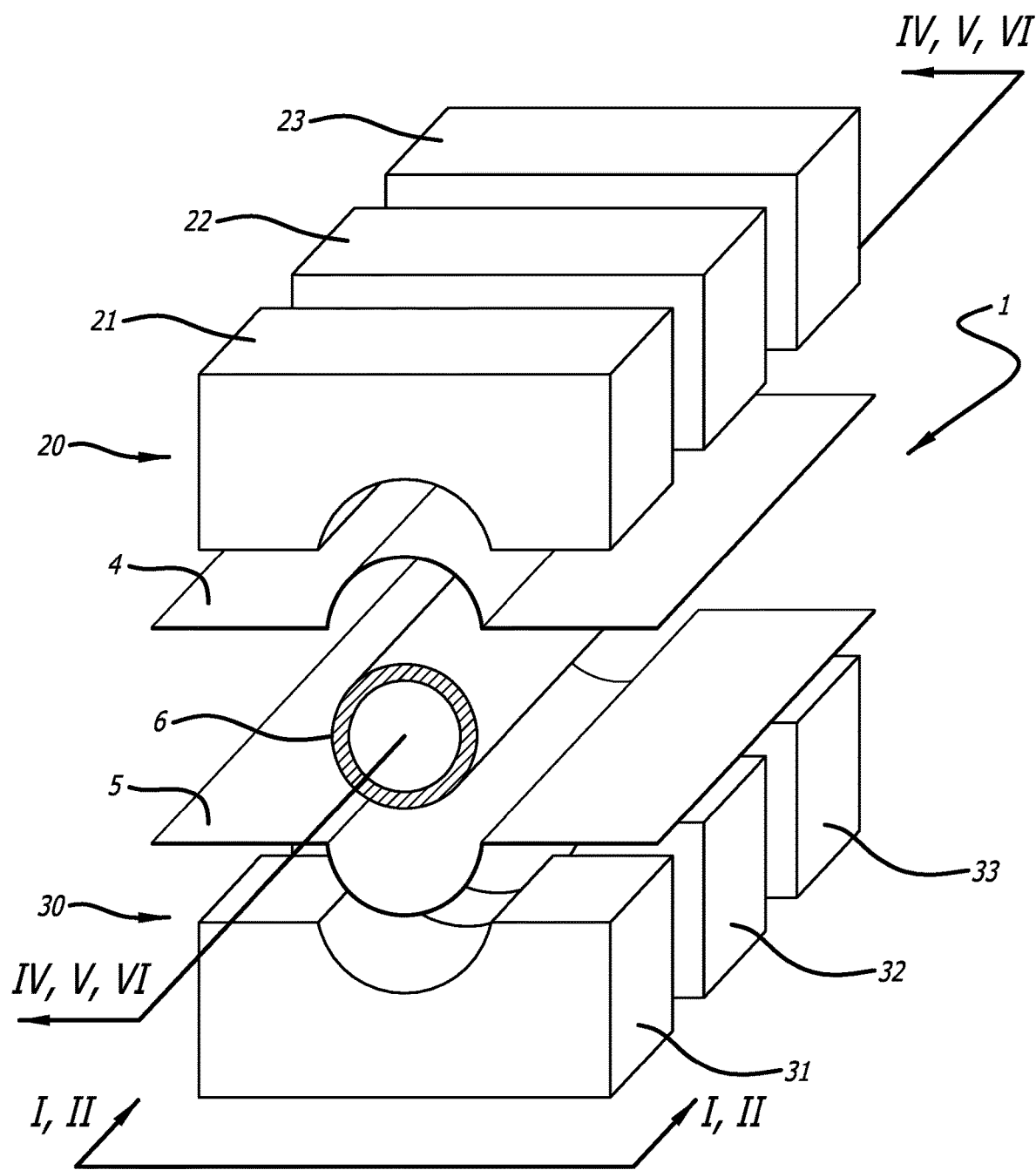

The welding tool 1 in FIGS. 1 to 3 consists essentially of an upper die 2 and a lower die 3. The tool is designed to carry out an HF surface welding process, in particular a pure HF surface welding process.

The HF surface welding process which uses welding tool 1 is intended to provide a fused seal of parts with an axial direction inserted between the upper film 4 and the lower film 5.

The upper die 2 and the lower die 3 are two electrically separated electrodes and can be polarized differently by the welding tool 1. The electrodes simultaneously enable a fused seal of both the upper film 4 to lower film 5 and between the films and the inserted part in a single welding procedure.

During the welding procedure, the upper die 2 and the lower die 3 are polarized differently. In this way, a symmetric HF primary field is set up between the electrodes.

For example, this enables the tubular inserted part 6 in FIG. 1 to be sealed by fusion to the films. However, it is not necessary for the inserted piece with the axial direction to be a hollow member. It can also be a circular solid member such as the circular inserted piece 7 (see FIG. 2).

Of course, other cross sections of inserted pieces can be advantageous, for example those in the shape of an oval, a polygon, a rectangle, a diamond with sharp or round corners, or a square.

These cross sections can be provided with an internal opening. In the process, it is not necessarily required for this opening to have a round cross section or to be centrally positioned. There are also other conceivable cross sections of the opening of inserted pieces, for example in the form of an oval, a polygon, a rectangle, or a square.

It is expressly noted that an alternative, advantageous design not shown here can be to distribute along the periphery of the medical bag a plurality of inserted parts with an axial direction. In this way, medical bags with a plurality of inserted parts can be produced, said parts having a plurality of tubular openings, for example.

Since tool 1 is designed symmetric with respect to upper die 2 and lower die 3 relative to the plane of separation between upper film 4 and lower film 5, a symmetrical layout sets up during the welding procedure both with respect to the main HF field and with respect to the HF stray field which will be introduced and further explained below. The welding therefore proceeds very homogeneously.

The welding tool 1 comprises a plurality of upper die electrode lamellae disposed in parallel next to one another in an upper die assembly 20 and a plurality of lower die electrode lamellae disposed in parallel next to one another in a lower die assembly 30.

The upper die assembly 20 comprises a first upper electrode lamella 21, a parallel second upper electrode lamella 22 and a parallel third upper electrode lamella 23. The lower die assembly 30 is designed symmetrical with respect to the upper die assembly 20. Thus, a first lower electrode lamella 31, a parallel second lower electrode lamella 32 and a parallel third lower electrode lamella 33 are located at the same axial height.

Of course, a pair of just two parallel upper and symmetrical lower electrode lamellae can be implemented as well. Furthermore, any multiple of parallel upper and symmetric lower electrode lamellae are possible.

The electrode lamellae have a central area with recesses in order to hold the inserted piece with an axial direction. The shape of the recesses depends on the geometry of the inserted piece to be sealed in.

The recesses at the electrode lamellae allow the lamellae to be pressed flat against the surface of the inserted piece during operation under pressure, wherein the upper film 4 and the lower film 5 are pressed inward while surrounding the inserted part in the area of the recess.

Figure 6:
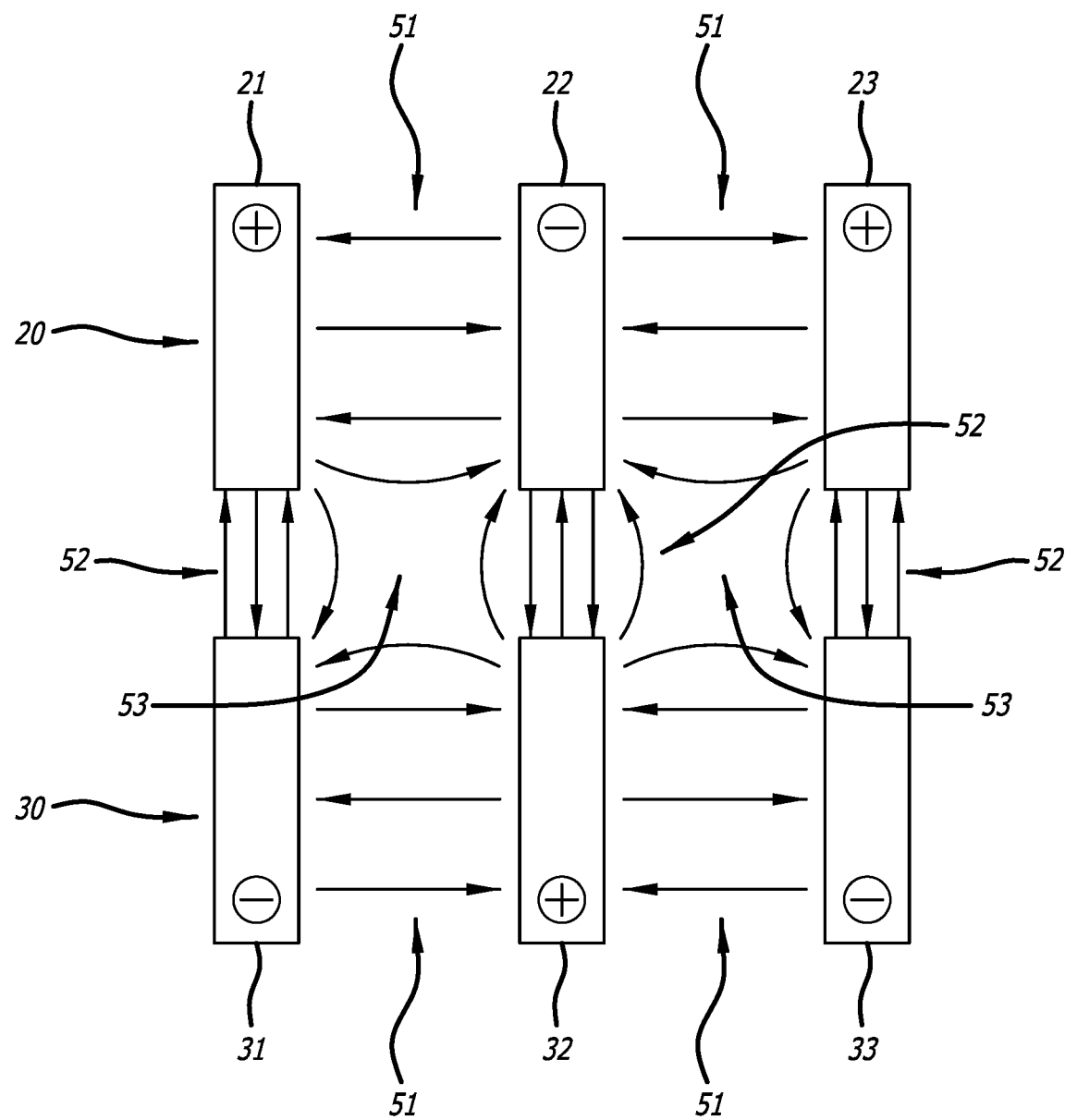

During the welding process, a polarization of the electrode lamellae is selected such that the electrode lamellae are alternatingly polarized along the axial direction and oppositely polarized perpendicular thereto (see FIG. 6).

In the process, axially parallel main HF fields 51 set up between the electrode lamellae of the upper die 2 which are oriented parallel with one another, and between the electrode lamellae of the lower die 3 which are oriented parallel with one another.

Furthermore, as a result of the arrangement of the electrode lamellae and the polarization of the electrode lamellae, axially normal main HF fields 52 result between the symmetrically-disposed electrode lamellae of the upper die 2 and the lower die 3, respectively.

Also, HF stray fields 53 issue from the edges of the electrode lamellae, the fields being characterized in that the field lines cannot be described by a straight line.

The HF stray fields also result between adjacent electrode lamellae of different respective polarities.

Since for cross-field welding the tool 1 disclosed here has a different polarity for all adjacent electrode lamellae, both in when upper die 2 and lower die 3 are viewed separately and when HF tool 1 is viewed as a whole, this gives rise to the characteristic cross field model of HF stray field 53

Tool 1 facilitates the welding both of the films with one another and of the films to the surface of the inserted parts in a single welding procedure.

The main HF fields are primarily responsible for the welding of the films to one another and the HF stray fields 53 are primarily responsible for the welding of the films to the surface of the inserted part.

In an alternative embodiment of the HF welding tool 1 (see FIGS. 4 and 5), the electrode lamellae of upper die 2 and lower die 3 are separated from one another along the axial direction of the inserted part by way of a dielectric material 40 which comprises a solid member.

As was already explained above, almost any geometry of inserted parts can also be sealed between the electrode lamellae in the alternative embodiment of HF welding tool 1 described here. In the process, the contour of the recess of the electrode lamellae may have to be adapted.

The geometry of the dielectric material 40 can be varied. In the process, it is possible that the dielectric material 40 has a setback edge and/or forward edge 41 relative to the electrode lamellae or ends flush with the electrode lamellae (see flush edge 42).

Thus, it is possible to structure the contour in the welding area at the bag being produced such that a desired contour results; this is because the plastic begins to flow during the welding procedure and so can flow into the contouring of the dielectric material 40 due to the shape thereof.

Furthermore, this contour can also be adapted to positively lock with components positioned thereon.

Also, the contouring of the dielectric material 40 enables a targeted distribution of the energy input into the individual areas welded so that as perfect and homogeneous of a weld can be achieved as possible.

Also, by being able to control energy input this way, an especially energy efficient, homogeneous HF weld can be achieved in only a single welding process.

LIST OF REFERENCE SIGNS USED

1 Welding tool
2 Upper tool
3 Lower tool
4 Upper film
5 Lower film
6 Tubular inserted part
7 Round inserted part
20 Upper tool assembly
21 First upper electrode lamella
22 Second upper electrode lamella
23 Third upper electrode lamella
30 Lower tool assembly
31 First lower electrode lamella
32 Second lower electrode lamella
33 Third lower electrode lamella
40 Dielectric material
41 Leading edge
42 Flush edge
51 Axially-parallel main HF field
52 Axially-normal main HF field
53 HF stray field

What is claimed is:

1. A tool for HF welding an inserted part with an axial direction to two films to form a bag, comprising:
    an upper die;
    a lower die;
    wherein each of said upper die and said lower die includes a plurality of electrode lamellae arranged such that said electrode lamellae are alternatingly polarized along said axial direction and oppositely polarized perpendicular to the axial direction.

2. The tool of claim 1 wherein each of the upper die and the lower die have an equal number of electrode lamellae.

3. The tool of claim 1 wherein each of the electrode lamellae of the upper die are separated from adjacent electrode lamellae by solid members of dielectric material.

4. The tool of claim 3 wherein each of the solid members comprises a leading edge that is setback relative to the adjacent electrode lamellae.

5. The tool of claim 3 wherein each of the solid members comprises a leading edge that is flush with the adjacent electrode lamellae.

6. The tool of claim 3 wherein the solid members comprise contoured leading edges.

7. A system for producing a bag for medical purposes, comprising:
    a film feeder;
    a filling station; and,
    a welding station including a tool having:
        an upper die and a lower die;
        wherein each of said upper die and said lower die includes a plurality of electrode lamellae arranged such that said electrode lamellae are alternatingly polarized along an axial direction and oppositely polarized perpendicular to the axial direction.

8. The system of claim 7 wherein each of the upper die and the lower die have an equal number of electrode lamellae.

9. The system of claim 7 wherein each of the electrode lamellae of the upper die are separated from adjacent electrode lamellae by solid members of dielectric material.

10. The system of claim 9 wherein each of the solid members comprises a leading edge that is setback relative to the adjacent electrode lamellae.

11. The system of claim 9 wherein each of the solid members comprises a leading edge that is flush with the adjacent electrode lamellae.

12. The system of claim 9 wherein the solid members comprise contoured leading edges.

13. The system of claim 9 further comprising:
    an HF power circuit;
    a plurality of support rods usable for holding parts between said upper die and said lower die;
    wherein said support rods are electrically separated from said HF power circuit.

14. A method of producing a bag for medical purposes comprising:
    guiding two films and an inserted part with an axial direction into a welding station, the welding station including opposing dies, each of said opposing dies including a plurality of electrode lamellae arranged such that said electrode lamellae are alternatingly polarized relative to adjacent lamellae and oppositely polarized relative to opposing lamellae;
    positioning the inserted part between the two films;
    laying the two films against the sides of the inserted part; and,
    subjecting the electrode lamellae to high-frequency electricity, thereby welding the two films around the inserted part.

15. The method of claim 14 further comprising: providing a plurality of solid dielectric members between adjacent electrode lamellae of each die.

16. The method of claim 15 further comprising producing a flat weld by aligning leading edges of the solid dielectric members and leading edges of the adjacent electrode lamellae such that said leading edges are flush with each other.

17. The method of claim 15 further comprising producing a contoured weld by aligning leading edges of the solid dielectric members and leading edges of the adjacent electrode lamellae such that adjacent leading edges are offset relative to each other.

18. The method of claim 17 wherein said adjacent leading edges are arranged such that said leading edges of said solid dielectric members are setback relative to the leading edges of the adjacent electrode lamellae.

19. The method of claim 15 further comprising producing a contoured weld by providing contoured leading edges of said solid dielectric members.

* * * * *